(12) United States Patent
Ozaki

(10) Patent No.: US 7,061,631 B2
(45) Date of Patent: Jun. 13, 2006

(54) DATA PROCESSING APPARATUS AND METHOD FOR MAINTAINING SECURITY OF IMAGE DATA, AND COMPUTER PROGRAM THEREOF STORED IN A COMPUTER READABLE MEDIUM

(75) Inventor: Hiroshi Ozaki, Suginami-ku (JP)

(73) Assignee: Canon Kabushiki Kaisha (JP)

( * ) Notice: Subject to any disclaimer, the term of this patent is extended or adjusted under 35 U.S.C. 154(b) by 1279 days.

(21) Appl. No.: 09/777,116

(22) Filed: Feb. 5, 2001

(65) Prior Publication Data

US 2001/0012114 A1 Aug. 9, 2001

(30) Foreign Application Priority Data

Feb. 3, 2000 (JP) .............................. 2000-026416
Dec. 27, 2000 (JP) .............................. 2000-399024

(51) Int. Cl.
*G06F 3/12* (2006.01)
*G06K 15/02* (2006.01)

(52) U.S. Cl. ..................................... 358/1.13; 358/1.14

(58) Field of Classification Search ......... 358/1.1–1.18
See application file for complete search history.

(56) References Cited

U.S. PATENT DOCUMENTS 6,166,826 A * 12/2000 Yokoyama ................. 358/1.16
6,943,907 B1 * 9/2005 Kim ........................... 358/1.14

* cited by examiner

*Primary Examiner*—Douglas Q. Tran
(74) *Attorney, Agent, or Firm*—Rossi, Kimms & McDowell, LLP

(57) ABSTRACT

There are provided a data processing apparatus and a data processing method which allow a user to easily obtain image data to be distributed to a third person and are also capable of maintaining the security of image data to be kept secret, and a storage medium storing a program for executing the data processing method. A storage section stores and retains confidential image data and non-confidential image data, and a CPU provides such control as to display image data stored in the storage section. When it is determined that the confidential image data are to be displayed, the CPU provides such control as to display both the confidential image data and the non-confidential image data, while when it is determined that the confidential image data are not to be displayed, the CPU provides such control as to display the non-confidential image data.

34 Claims, 8 Drawing Sheets

*FIG. 5A*

DATA SAVED IN BOX ARE REFERENCED

PASSWORD: [        ]

[CHECK]  [NOT CHECK]

*FIG. 5B*

LIST OF DOCUMENT NAMES

DOCUMENT NAME:
● NOTICE OF CELEBRATION PARTY
  APPLICATION FORM
  SPECIFICATION
  CONTRACT DOCUMENT

[←] [→]

[PRINT]  [RETURN]

*FIG. 5C*

LIST OF DOCUMENT NAMES

DOCUMENT NAME:
● NOTICE OF CELEBRATION PARTY
  APPLICATION FORM

[←] [→]

[PRINT]  [RETURN]

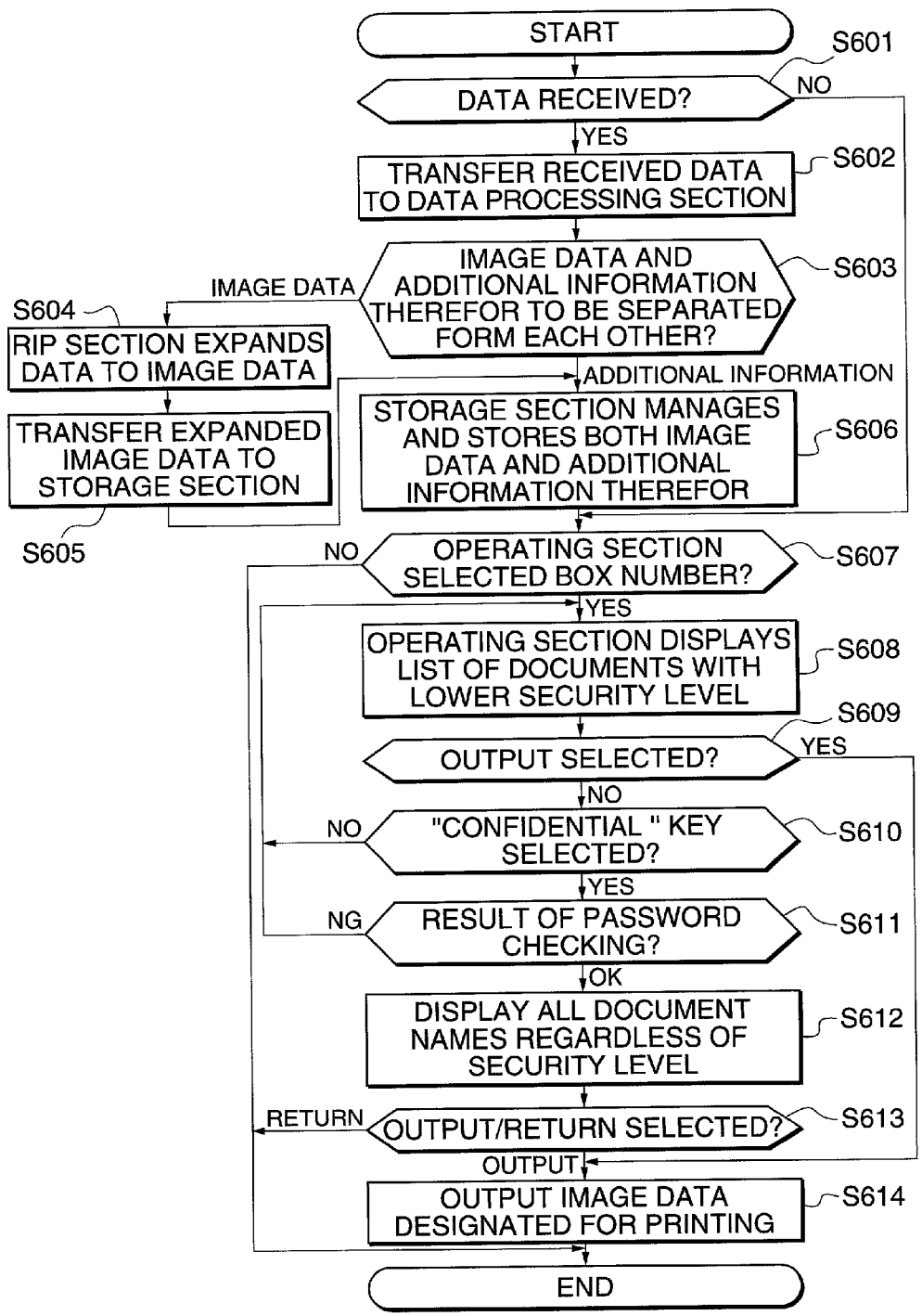

FIG. 8A

LIST OF DOCUMENT NAMES

DOCUMENT NAME:
● NOTICE OF CELEBRATION PARTY
SEMINAR APPLICATION FORM

↑ ↓

[CONFIDENTIAL] [PRINT] [RETURN]

FIG. 8B

DISPLAY CONFIDENTIAL DOCUMENT

PASSWORD: [ ]

[CHECK] [RETURN]

FIG. 8C

LIST OF DOCUMENT NAMES

DOCUMENT NAME:
● NOTICE OF CELEBRATION PARTY
SEMINAR APPLICATION FORM
SPECIFICATION
CONTRACT1

↑ ↓

[PRINT] [RETURN]

DATA PROCESSING APPARATUS AND METHOD FOR MAINTAINING SECURITY OF IMAGE DATA, AND COMPUTER PROGRAM THEREOF STORED IN A COMPUTER READABLE MEDIUM

BACKGROUND OF THE INVENTION

1. Field of the invention

The present invention relates to a data processing apparatus and method for processing image data, and a storage medium storing a program for executing the data processing method.

2. Prior Art

With recent diffusion of digital copiers, complex machines have become commercial available, which provide a plurality of functions such as a facsimile transmission and reception function using a scanner or a printer of a copier, and a PDL (Page Description Language) printing function. Such a complex machine is configured to execute not only unitary functions of copying, facsimile, PDL, and others but also functions each comprising a combination of plural functions, for example, facsimile transmission of PDL-expanded images. Further, such a complex machine is configured such that its functions can be used by computer apparatuses or the like when it is connected to these apparatuses via a LAN (Local Area Network).

Further, in such a complex machine, a control program for a printer section is shared by the copying function, the PDL print function, a facsimile print function, and other functions, and a control program for a reader section is shared by the copying function, a facsimile reading function, a scanner function, and other functions, thereby reducing the capacity of the control programs required to realize the various functions to allow desired functions to be economically and simply realized.

Further, such a complex machine is provided with an image storage section such as a large-capacity hard disk or a semiconductor memory which stores image data, to provide desired functions by executing, on this image storage section, a combination of an image input job of inputting image data read by a scanner, PDL-expanded image data, document data received via facsimile, or the like and an image output job of reading out image data stored in the image storage section to print them out, transmit them via facsimile, or transfer them as images to a computer apparatus via a network.

Further, such a complex machine can realize a mailbox function, which temporarily stores image data using a part of the large-capacity hard disk having image data stored therein so as to allow the data to be read out in desired timing.

To accomplish the mailbox function, for example, 100 boxes are provided in a fixed area of the hard disk so that a user can save image data in corresponding boxes by designating box numbers when loading the image data from a computer connected to the complex machine. Whether or not a password is to be checked can be set for each box, and each box can be named.

In the above described conventional complex machine, however, if each box is used by the user for security, since a password is set for each box, then no third person can obtain image data to be distributed to him unless he inputs the correct password. In addition, if each box is used to distribute image data to a third person, then it is difficult or impossible for a third person to set such password checking that he can obtain the image data at any time. It has thus been difficult to both maintain the security of image data to be kept secret and obtain image data to be distributed to a third person.

SUMMARY OF THE INVENTION

The present invention has been made in order to solve the above described problems with the prior art, and it is an object of the present invention to provide a data processing apparatus and a data processing method which allow a user to easily obtain image data to be distributed to a third person and are also capable of maintaining the security of image data to be kept secret, and a storage medium storing a program for executing the data processing method.

To attain the above object, the present invention provides a data processing apparatus comprising storage means for storing and retaining confidential image data and non-confidential image data, display control means for providing such control as to display image data stored in the storage means, and determining means for determining whether or not to display the confidential image data, and the display control means is responsive to a determination made by the determining means that the confidential image data are to be displayed, for providing such control as to display both the confidential image data and the non-confidential image data, and the display control means is responsive to a determination made by the determining means that the confidential image data are not to be displayed, for providing such control as to display the non-confidential image data.

Preferably, the data processing apparatus further comprises selecting means for allowing a user to select image data to be output from the displayed image data controlled to display by the display control means, and output means for outputting the image data selected by the selecting means. Typically, the output means prints the image data selected by the selecting means.

Also preferably, the storage means has a plurality of boxes that store the image data, and the data processing apparatus further comprises box selecting means for allowing the user to select a desired one of the plurality of boxes, and the display control means provides such control as to display image data contained in the box selected by the box selecting means.

More preferably, when the desired box is selected by the box selecting means, the determining means determines whether or not to display the confidential image data, and the display control means is responsive to results of the determination, for controlling display of the confidential image data and the non-confidential image data.

Preferably, when the desired box is selected by the box selecting means, the display control means provides such control as to display non-confidential image data contained in the selected box.

Preferably, if the determining means determines that the confidential image data are to be displayed while the non-confidential image data contained in the selected box are displayed, the display control means provides such control as to display both confidential and non-confidential image data contained in the selected box.

Advantageously, the determining means determines whether or not to display the confidential image data, by checking a password.

In a preferred form of the invention, the storage means stores the confidential image data and the non-confidential image data in separate storage areas.

Also advantageously, the data processing apparatus further comprises registering means for registering the image data in the storage means.

In this case, the data processing apparatus is preferably constructed such that that the storage means has a security storage area and a non-security storage area in which the confidential image data and the non-confidential image data are separately stored, respectively, and the registering means determines whether the image data are to be registered in the security storage area or in the non-security storage area, depending on whether or not the image data are confidential, and registers the image data in one of the security storage area and the non-security storage area in which the image data are determined to be registered.

To attain the above object, the present invention further provides a data processing method of controlling a data processing apparatus having storage means for storing and retaining confidential image data and non-confidential image data, the method comprising a display control step of providing such control as to display image data stored in the storage means, and a determining step of determining whether or not to display the confidential image data, and the display control step is responsive to a determination made by the determining step that the confidential image data are to be displayed, for providing such control as to display both the confidential image data and the non-confidential image data, and the display control step is responsive to a determination made by the determining step that the confidential image data are not to be displayed, for providing such control as to display the non-confidential image data.

To attain the above object, the present invention also provides a storage medium storing a computer readable program for controlling a data processing apparatus having storage means for storing and retaining confidential image data and non-confidential image data, the program comprising a program code for causing a computer to execute a data processing method comprising a display control step of providing such control as to display image data stored in the storage means, and a determining step of determining whether or not to display the confidential image data, and the display control step is responsive to a determination made by the determining step that the confidential image data are to be displayed, for providing such control as to display both the confidential image data and the non-confidential image data, and the display control step is responsive to a determination made by the determining step that the confidential image data are not to be displayed, for providing such control as to display the non-confidential image data.

According to the present data processing apparatus and method and the present storage medium, both image data to be kept secret using a password or the like and image data which do no require security and which can be obtained by anyone can be temporarily stored in each box, thereby maintaining the security of the image data to be kept secret, and also allowing a user to easily obtain image data to be distributed to a third person.

The above and other objects of the invention will become more apparent from the following drawings taken in conjunction with the accompanying drawings.

BRIEF DESCRIPTION OF THE DRAWINGS

FIGS. 5A to 5C are views showing examples of display on a screen of an operating section of the data processing apparatus according to the first embodiment, which are used in executing the operation shown in FIG. 4;

FIG. 7 is a flow chart showing a flow of the operation of a data processing apparatus according to a second embodiment of the present invention; and FIGS. 8A to 8C are views showing examples of display display on a screen of an operating section of the data processing apparatus according to the second embodiment, which are used to execute the operation shown in FIG. 7;

DETAILED DESCRIPTION OF PREFERRED EMBODIMENTS

The present invention will now be described below in detail with reference to the drawings showing embodiments thereof.

Figure 1:
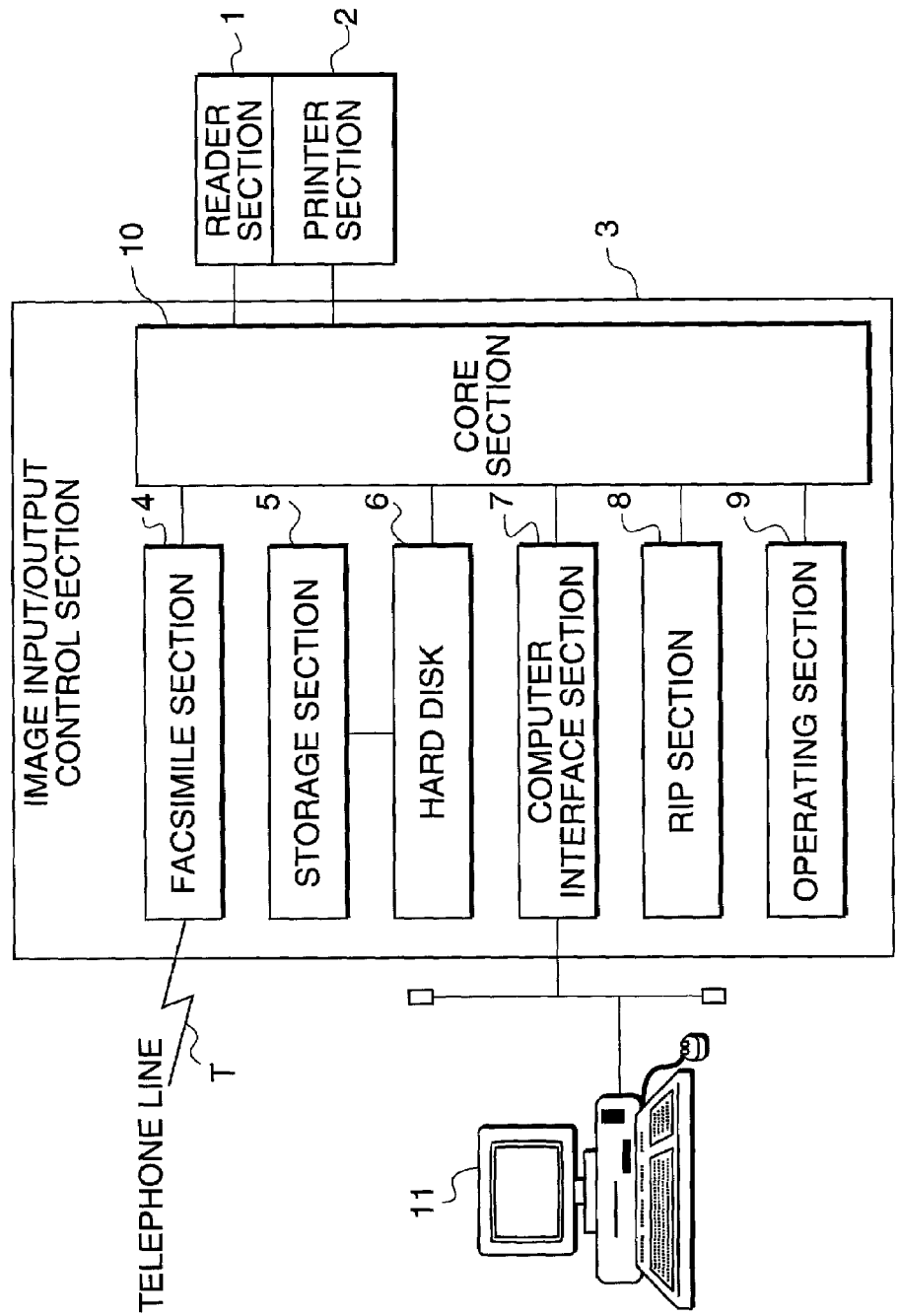
FIG. 1 is a block diagram showing the construction of a data processing apparatus according to a first embodiment of the present invention.

FIG. 1 is a block diagram showing the construction of a data processing apparatus according to a first embodiment of the present invention. In the figure, reference numeral 1 denotes a reader section for reading an image from an original and outputting image data to an image input/output control section 3, described later, depending on the image read from the original. Reference numeral 2 denotes a printer section for recording an image on recording paper as a recording medium, depending on the image data from the image input/output control section 3. The image input/output control section 3 is connected to the reader section 1 and printer section 2 and is comprised of a facsimile section 4, a storage section 5, a computer interface section 7, a RIP (Raster Image Processor) section 8, an operating section 9, a core section 10, and others.

The facsimile section 4 decompresses compressed image data received via a telephone line T to transfer the decompressed image data to the core section 10 or compresses image data transferred from the core section 10 to transmit the compressed image data via the telephone line T. The transmitted and received image data can be temporarily saved in a hard disk 6 connected to the storage section 5.

The storage section 5 has the hard disk 6 connected thereto and compresses image data transferred from the core section 10 and store the compressed image data in the hard disk 6 together with ID (identifier) numbers for retrieving them. The storage section 5 also retrieves compressed image data stored in the hard disk 6, based on code data transferred via the core section 10, subsequently reads out and decompresses the retrieved compressed image data, and then transfers the decompressed image data to the core section 10.

The computer interface section 7 functions as an interface between a personal computer (PC) or a workstation (WS) (hereafter referred to as "the PC/WC") 11, which is an external apparatus, and the core section 10, and may be connected with the PC/WC 11 via a local interface operating on a one-to-one correspondence basis or via a network.

The RIP section 8 expands code data (PDL) representing images transferred from the PC/WS 11 to image data which can be recorded by the printer section 2.

The operating section 9 is comprised of a touch panel display and hard keys to allow a user to issue commands for executing operations to the present data processing apparatus or set operations to be executed by the apparatus, using a user interface.

The core section 10 controls the flow of data between the reader section 1, the printer section 2, the facsimile section 4, the storage section 5, the computer interface section 7, the RIP section 8, and the operating section 9.

Figure 2:
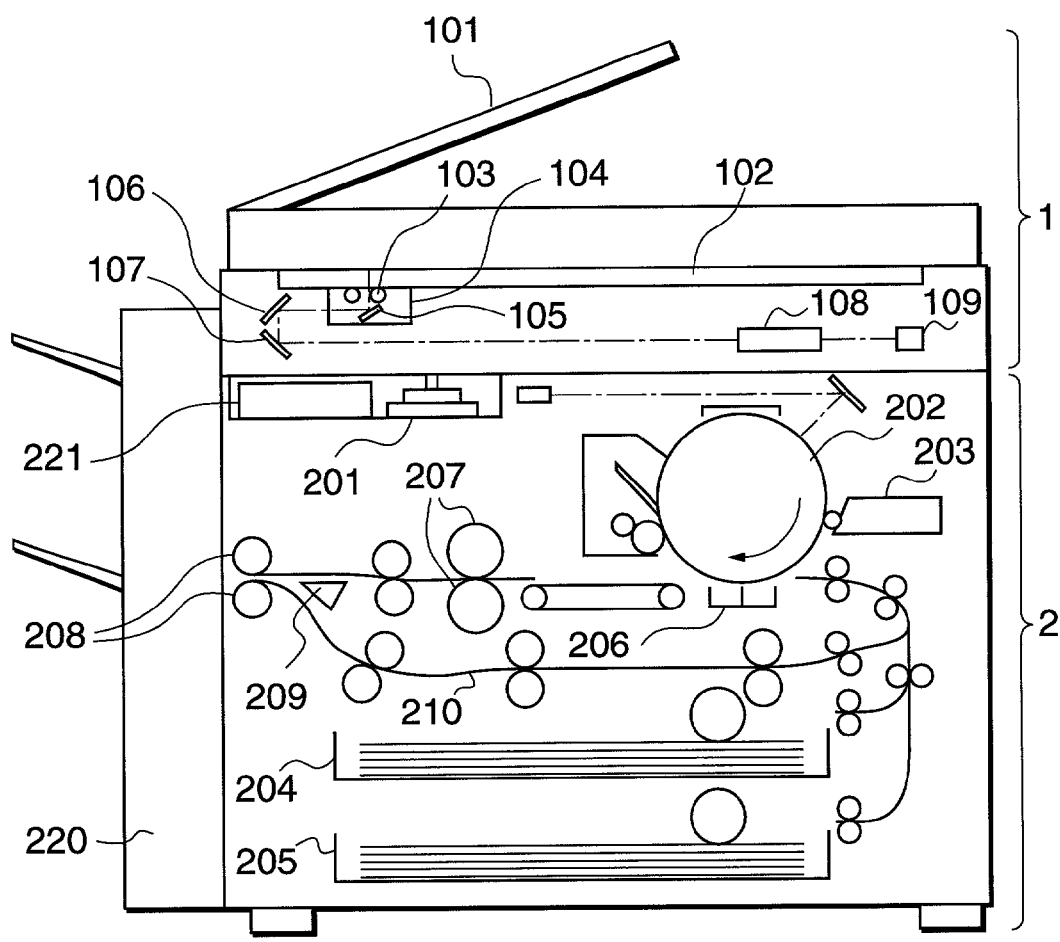
FIG. 2 is a sectional view showing the constructions of a reader section and a printer section of the data processing apparatus according to the first embodiment.

FIG. 2 is a sectional view showing the constructions of the reader section 1 and printer section 2. In the figure, an original sheet feeding device 101 of the reader section 1 feeds originals onto a platen glass 102 sheet by sheet starting with the upper most one, and after an original reading operation has been completed on each original, discharges the original from the platen glass 102. Once the original is transferred to the platen glass 102, a lamp 103 is lighted and a scanner unit 104 starts moving to expose and scan the original. During this exposure scanning, light reflected from the original is guided to a CCD image sensor (hereafter referred to as "the CCD") by means of mirrors 105, 106, and 107 and a lens 108. The reflected light corresponding to the image on the original, obtained by this scanning is read by the CCD 109. Image data output from the CCD 109 are subjected to a predetermined process and then transferred to the core section 10 of the image input/output control section 3 shown in FIG. 1.

A laser driver 221 of the printer section 2 drives a laser light-emitting section 201 to cause the same to emit laser light corresponding to the image data output from the core section 10 of the image input/output control section 3. This laser light is applied to a photosensitive drum 202, whereby a latent image corresponding to the laser light is formed on the drum 202. A developing device 203 attaches a developer to a portion of the photosensitive drum 202 corresponding to the latent image. In timing synchronized with the start of emission of the laser light, recording paper is fed from either a first recording paper cassette 204 or a second recording paper cassette 205 and transferred to a transfer section 206, which transfers the developer attached to the photosensitive drum 202 to the recording paper. The recording paper with the developer is conveyed to a fixing section 207, which fixes the developer to the recording paper by means of heat and pressure. After passing through the fixing section 207, the recording paper is discharged to the outside by means of a discharge roller 208, or if a double-side recording mode has been set, is conveyed to the discharge roller 208, which is then rotated in the opposite direction to guide the recording paper to a sheet refeeding conveying path 210 by means of a flapper 209. After being guided to the sheet refeeding conveying path 210, the recording paper is fed to the transfer section 206 in the above-mentioned timing.

Further, if a Z folding unit, not shown, is provided in the main body of the data processing apparatus, the recording paper is conveyed to the Z folding unit, where it is subjected to Z folding according to an operation performed via the operating section 9 shown in FIG. 1. Further, if a finisher 220 is provided in the main body as in the illustrated example, the discharged recording paper is bundled for classification or is punched or stapled according to the user's designation. Further, if a saddle stitcher is used, the recording paper may be stitched at a central portion thereof and folded for book-binding. Moreover, if an inserter, not shown, is provided in the data processing main body, previously printed recording paper can be used as a cover for a book without being passed through a recording paper conveying path in the printer section 2.

Figure 3:
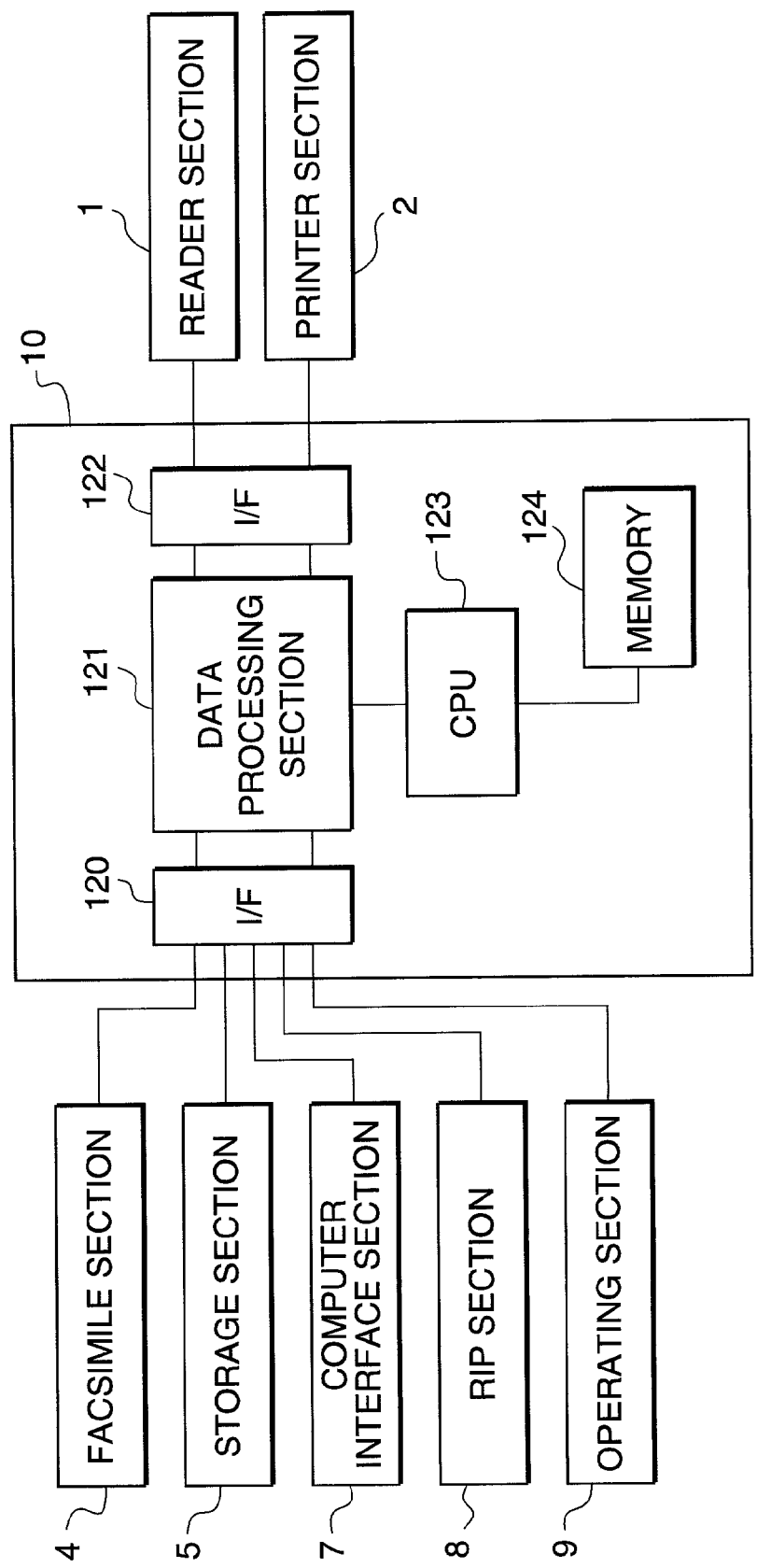
FIG. 3 is a block diagram showing the construction of a core section of the data processing apparatus according to the first embodiment.

FIG. 3 is a block diagram showing the construction of the core section 10 shown in FIG. 1. In FIG. 3, image data from the reader section 1 are transferred to a data processing section 121 via an interface (I/F) 122. The data processing section 121 executes image processing such as an image rotating process or a variable power process, compression and decompression of image data, and others, and internally has a page memory for plural pages of image data corresponding to A4/letter sizes. The image data transferred from the reader section 1 to the data processing section 121 are temporarily stored in the page memory and then compressed and transferred to the storage section 5 via the interface (I/F) 120.

Further, code data representing an image input via the computer interface section 7 are transferred to the data processing section 121 via the I/F 120 and expanded to image data. The image data are transferred to the data processing section 121, subsequently temporarily stored in the page memory, and then compressed and transferred to the storage section 5.

Further, output start condition data transmitted together with the image data are transmitted to an image output start determining section, not shown, to determine output start conditions.

The image data from the storage section 5 are transferred to the data processing section 121, where they are decompressed and temporarily stored in the page memory. Then, in response to a command from the image output start determining section, the image data are transferred to the printer section 2, the facsimile section 4, or the computer interface section 7.

By switching an internal selector, not shown, the image data input to the data processing section 121 and then temporarily stored in the page memory as described above can be transferred to the printer section 2, the facsimile section 4, or the computer interface section 7 before being transferred to the storage section 5.

A CPU (Central Processing Unit) 123 executes the above described control in accordance with a control program stored in a memory 124 and an operation performed via the operating section 9 or control commands transferred together with image data. The memory 124 is also used as a work area for the CPU 123.

It is thus possible to carry out a process for executing a function which is a combination of functions such as reading of images from originals, printing of the images, transmission and reception of image data, and inputting and outputting of data to and from a computer, via the data processing section 121, the image output start determining section, and the storage section 5, based on the control provided by the core section 10.

Figure 4:
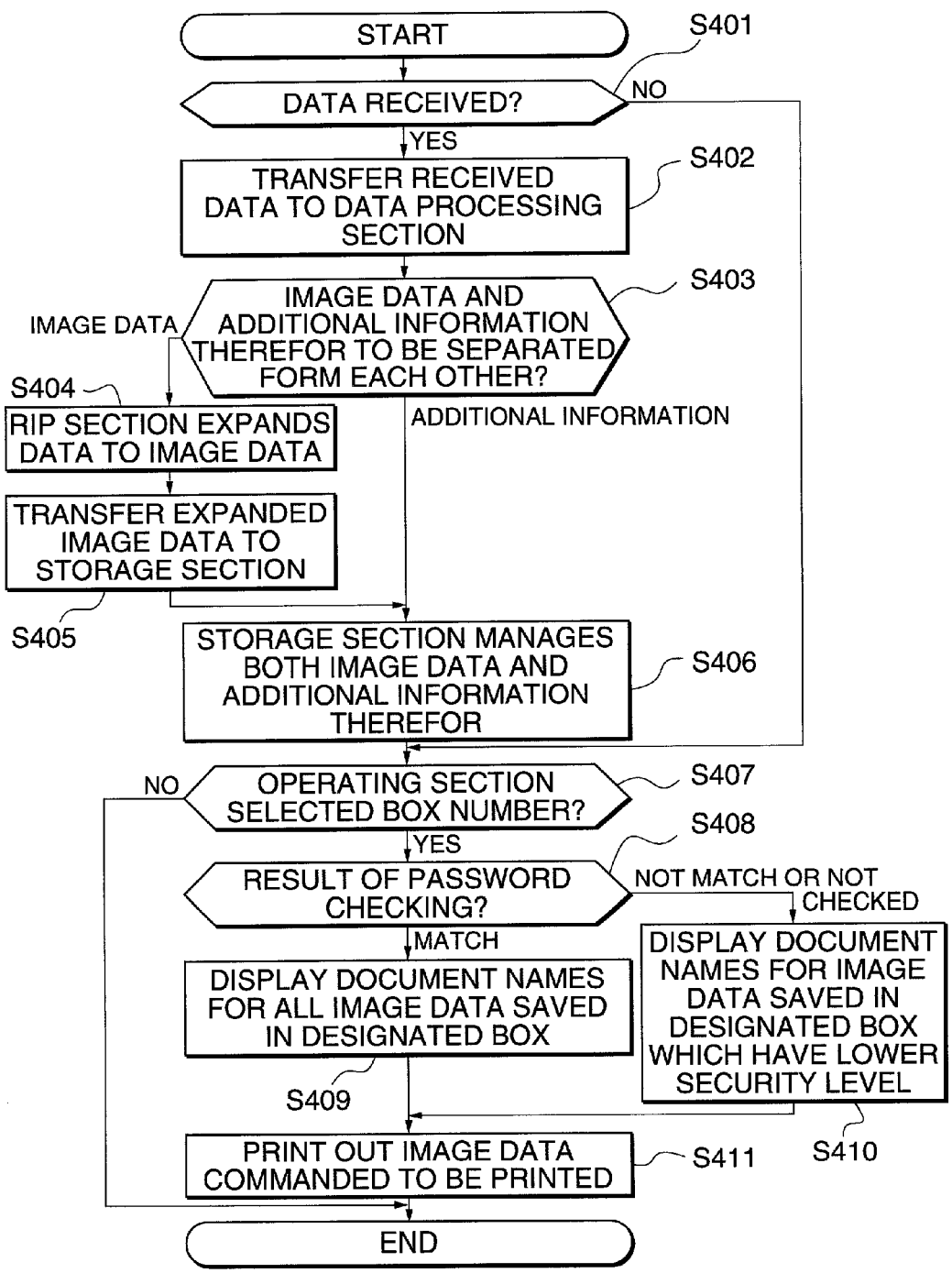
FIG. 4 is a flow chart showing a flow of the operation of the data processing apparatus according to the first embodiment.

Next, a specific control operation performed if image data A (PDL), security level information therefor, the number of a box which retains the image data, and others are transmitted via the computer interface section 7 will be explained with reference to FIG. 4.

When the image data A (PDL), as well as the number of the box which retains the image data, the security level information for the image data, and document names therefor (hereafter referred to as "the additional information for the image data") are input from the computer interface section 7 (step S401), the image data A (PDL) and the additional information therefor are transferred to the data processing section 121 via the I/F 120 (step S402). Subsequently, the data processing section 121 separates the image data A (PDL) from the additional information (step S403), and the image data A (PDL) are transferred to the RIP section 8, where they are expanded to image data (step S404). The expanded image data are returned to the data processing section 121, where they are temporarily stored in the page memory and then compressed and transferred to the storage section 5 (step S405). The image data are finally saved in the storage section 5 together with the additional information therefor (step S406).

Next, a procedure of outputting the image data thus saved in the storage section 5 will be explained with reference to FIG. 4 in conjunction with FIGS. 5A to 5C. FIGS. 5A to 5C are views showing examples of display on a screen of the operating section 9, which are used to output image data saved in the box. In FIG. 5A, a message "Data Saved in Box are Referenced", a password input block, a "Check" key, and a "Not Check" key are displayed. Further, in FIG. 5B, the document names for all the saved image data, a "Print" key, a "Return" key, an "Upward Arrow" key, and a "Downward Arrow" key are displayed. Further, in FIG. 5C, document names for image data with a lower security level, the "Print" key, the "Return" key, the "Upward Arrow" key, and the "Downward Arrow" key are displayed.

Figure 6:
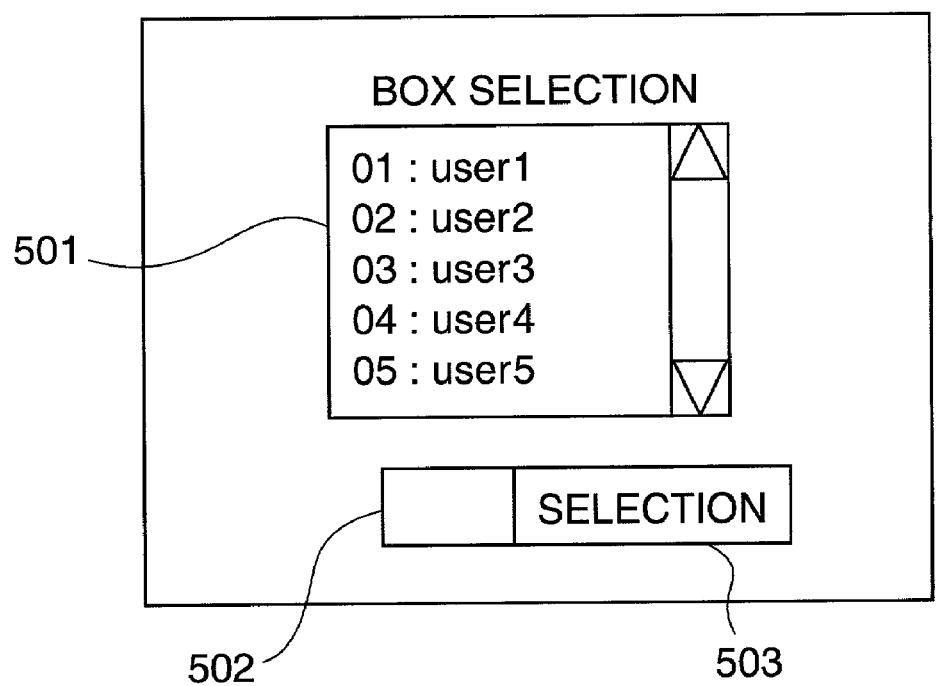
FIG. 6 is a view showing an example of display on the screen of the operating section which allows a user to select a box.

FIG. 6 is a view showing an example of display on the screen of the operating section 9, which is used to select a box. This screen view is displayed after the step S406 has been executed. Box numbers 01 to 05 and box names user 1 to user 5 are displayed in a box display block 501. In this connection, other boxes (numbers and names) can be displayed by operating upward and downward arrow keys. When the user inputs a box number to a box number input block 502 and then depresses a Select button 503, a box is selected. Alternatively, the user may directly designate one of the boxes displayed in the box display block to select the same. The boxes are assigned to respective users or groups. In the present embodiment, image data to be registered are registered in a box designated by the additional information. Alternatively, image data may be registered in a box assigned to a terminal of the user who has performed the registration operation, by automatically determining the terminal.

After the processing at the above step S406 has been completed, when the user selects a box number on the display screen shown in FIG. 6 via the operating section 9 to output the image data retained in the box (step S407), a screen view such as the one shown in FIG. 5A on which a password is to be input is displayed if the password has previously been set for that box. If the user inputs the password to the password input block and then depresses the "Check" key, then the password is checked against a previously registered password (step S408).

If the two passwords are the same, then the document names for all the image data saved in the selected box are displayed regardless of the security level as shown in FIG. 5B (step S409).

On the other hand, if the two passwords are not the same or the user depresses the "Not Check" key, then only the document names for image data in the selected box which have a lower security level are displayed (step S410).

When the user selects a required one of the document names from the displayed list of document names shown in FIG. 5B or 5C using the "Upward Arrow" or "Downward Arrow" key, and then depresses the "Print" key, the storage section 5 is commanded via the data processing section 121 to output the image data identified by the selected document name. The image data A (PDL) are transferred from the storage section 5 to the data processing section 121, subsequently decompressed and temporarily stored in the page memory, and then transferred to the printer section 2, the facsimile section 4, or the computer interface section 7 (step S411).

Next, a second embodiment of the present invention will be described with reference to FIGS. 6 to 8. The construction of the data processing apparatus according to the present embodiment is identical or similar to that according to the first embodiment described above, and description thereof is therefore omitted.

A specific control operation performed if image data A (PDL), security level information for the image data, the number of the box which retains the image data, and others are transmitted via the computer interface section 7 will be explained with reference to a flow chart in FIG. 7.

When the image data A (PDL) and the additional information therefor are input from the computer interface section 7 (step S601), they are transferred to the data processing section 121 via the I/F 120 (step S602). Subsequently, the data processing section 121 separates the image data A (PDL) from the additional information (step S603), and the image data A (PDL) are transferred to the RIP section 8, where they are expanded to image data (step S604). The expanded image data are returned to the data processing section 121, where they are temporarily stored in the page memory and then compressed and transferred to the storage section 5 (step S605). The image data are finally saved in the storage section 5 together with the additional information therefor (step S606).

Next, a procedure of outputting the image data thus managed in the storage section 5 will be explained with reference to FIG. 7 in conjunction with FIGS. 8A to 8C. FIGS. 8A to 8C are views showing examples of display on the screen of the operating section 9, which are used to output image data saved in the box. In FIG. 8A, document names for image data with a lower security level, a "Print" key, a "Return" key, an "Upward Arrow" key, a "Downward Arrow" key, and a "Confidential Document" key are displayed. In FIG. 8B, a message "Confidential Document is displayed", a password input block, a "Check" key, and a "Return" key are displayed. In FIG. 8C, a list of the document names for all the saved image data, a "Print" key, a "Return" key, an "Upward Arrow" key, and a "Downward Arrow" key are displayed. After the processing at the above step S606 has been completed, when the user selects a box number on the display screen shown in FIG. 6 via the operating section 9 to output the image data retained in the box (step S607), a list of document names in the selected box which have a lower security level are displayed as shown in FIG. 8A (step S608). Then, when the user selects a required one of the document names from the displayed list of document names shown in FIG. 8A using the "Upward Arrow" or "Downward Arrow" key, and then depresses the "Print" key to execute an output selecting process (step S609), the process jumps to a step S614, described later. On the other hand, when the user selects the "Confidential Document" key in the screen shown in FIG. 8A without executing the output selecting process (step S610), a screen view for inputting a password is displayed as shown in FIG. 8B. If the user inputs the password to the password input block and then depresses the "Check" key, then the password is checked against the previously registered password (step S611). If the two passwords are the same, then the document names for all the image data saved in the box selected at the step S607 are displayed regardless of the security level, as shown in FIG. 8C (step S612).

On the other hand, if the two passwords are not the same or the user depresses the "Return" key, then the process returns to the step S608 to display only the document names for the image data with a lower security level.

When the user selects a required one of the document names from the list of document names displayed at the step S608 or S612, and then depresses the "Print" key, the storage section 5 is commanded via the data processing section 121 to output the image data identified by the selected document name. The image data A (PDL) are transferred from the storage section 5 to the data processing section 121, subsequently decompressed and temporarily stored in the page memory, and then transferred to the printer section 2, the facsimile section 4, or the computer interface section 7 (step S614).

In the above described embodiments, image inputs and outputs are processed via the hard disk 6 connected to the storage section 5, but it goes without saying that the present invention is similarly applicable to, for example, a construction that a part of the page memory of the data processing section 121 is used to perform the image input and output operations without using the hard disk 6.

It also goes without saying that the finisher may have different functions from those described above, and the functions of the finisher are similarly applicable even if other options are provided.

The present invention may be applied to a system comprised of plural pieces of equipment or to an apparatus comprised of one piece of equipment.

Of course, the present invention may be implemented by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code read out from the storage medium realizes the functions of either of the above described embodiments, so that the storage medium storing the program code also constitutes the present invention.

The storage medium for supplying the program code may be, for example, a floppy disk, a hard disk, an optical disk, a magneto-optical disk, a CD-ROM, a CD-R, a magnetic tape, a non-volatile memory card, or a ROM.

Further, it is to be understood that the functions of the above described embodiments may be accomplished not only by executing a program code read out by a computer, but also by causing an OS (Operating System) or the like which operates on the computer to perform a part or the whole of the actual operations based on instructions of the program code.

What is claimed is:

1. A data processing apparatus comprising:
   storage means for storing confidential image data, non-confidential image data, and additional information for the image data;
   display control means for providing control to display the additional information for the image data stored in said storage means; and
   determining means for determining whether or not to display the additional information for the confidential image data; and
   wherein:
   said display control means provides control to display the additional information for both said confidential image data and said non-confidential image data when said determining means determines to display the additional information for the confidential image data; and
   said display control means provides control to display the additional information for said non-confidential image data when said determining means determining means determines not to display the additional information for the confidential image data.

2. A data processing apparatus according to claim 1, further comprising:
   selecting means for allowing a user to select image data to be output from the displayed additional information for the image data controlled to display by said display control means; and
   output means for outputting the image data selected by said selecting means.

3. A data processing apparatus according to claim 1, wherein said storage means has a plurality of boxes that store said image data, and said data processing apparatus further comprises box selecting means for allowing the user to select a desired one of said plurality of boxes, and wherein said display control means provides control to display the additional information for the image data contained in the box selected by said box selecting means.

4. A data processing apparatus according to claim 3, wherein when the desired box Is selected by said box selecting means, said determining means determines whether or not to display the additional information for said confidential image data, and wherein said display control means controls display of the additional Information for the confidential image data and the non-confidential image data responsive to the determination of said determination means.

5. A data processing apparatus according to claim 3, wherein when the desired box is selected by said box selecting means, said display control means provides control to display the additional information for the non-confidential image data contained in the selected box.

6. A data processing apparatus according to claim 5, wherein if said determining means determines that the additional information for said confidential image data is to be displayed while the additional information for the non-confidential image data contained in the selected box is displayed, said display control means provides control to display the additional information for both confidential and non-confidential image data contained in the selected box.

7. A data processing apparatus according to claim 1, wherein said determining means determines whether or not to display the additional information for said confidential image data, by checking a password.

8. A data processing apparatus according to claim 1, wherein said storage means stores said confidential image data and said non-confidential image data in separate storage areas.

9. A data processing apparatus according to claim 2, wherein said output means prints the image data selected by said selecting means.

10. A data processing apparatus according to claim 1, further comprising registering means for registering said image data in said storage means.

11. A data processing apparatus according to claim 10, wherein said storage means has a security storage area and a non-security storage area in which said confidential image data and said non-confidential image data are separately stored, respectively, and wherein said registering means determines whether said image data is to be registered in said security storage area or in said non-security storage area, depending on whether or not said image data is confidential, and registers said image data in one of said security storage area and said non-security storage area in which the Image data is determined to be registered.

12. A data processing method of controlling a data processing apparatus having storage means for storing confidential image data, non-confidential image data, and additional information for the image data, the method comprising:
   a display control step of providing control to display the additional information for the image data stored in said storage means; and
   a determining step of determining whether or not to display the additional information for the confidential image data, and
   wherein:
   said display control step provides control to display the additional information for both said confidential image data and said non-confidential image data when said determining stay determines that the additional information for the confidential image data is to be displayed; and
   said display control step provides control to display the additional information for said non-confidential image data when said determining step determines that the additional information for the confidential image data is not to be displayed.

13. A data processing method according to claim 12, further comprising:
   a selecting step of allowing a user to select image data to be output from the displayed additional information for the image data controlled to display by said display control step; and
   an output step of outputting the image data selected by said selecting step.

14. A data processing method according to claim 12, wherein said storage means has a plurality of boxes that store said image data, and said data processing method further comprises a box selecting step of allowing the user to select a desired one of said plurality of boxes, and wherein said display control step comprises providing control to display the additional information for the image data contained in the box selected by said box selecting step.

15. A data processing method according to claim 14, wherein when the desired box is selected by said box selecting step, said determining step determines whether or not to display the additional information for said confidential image data, and wherein said display control step controls display of the additional Information for the confidential image data and the non-confidential image data responsive to the determination of said determination step.

16. A data processing method according to claim 14, wherein when the desired box is selected by said box selecting step, said display control step provides control to display the additional information for the non-confidential image data contained in the selected box.

17. A data processing method according to claim 16, wherein if said determining step determines that the additional information for said confidential image data is to be displayed while the additional information for the non-confidential image data contained in the selected box is displayed, said display control step provides control to display the additional information for both confidential and non-confidential image data contained in the selected box.

18. A data processing method according to claim 12, wherein said determining step comprises determining whether or not to display the additional information for said confidential image data, by checking a password.

19. A data processing method according to claim 12, wherein said storage step comprises storing said confidential image data and said non-confidential image data in separate storage areas.

20. A data processing method according to claim 13, wherein said output step comprises printing the image data selected by said selecting step.

21. A data processing method according to claim 12, further comprising a registering step of registering said image date in said storage step.

22. A data processing method according to claim 21, wherein said storage means has a security storage area and a non-security storage area in which said confidential image data and said non-confidential image data are separately stored, respectively, and said registering step comprises determining whether said image data is to be stored in said security storage area or in said non-security storage area, depending on whether or not said image data is confidential, and registering said image data in one of said security storage area and said non-security storage area in which the image data is determined to be registered.

23. A computer readable medium storing a computer readable program for controlling a data processing apparatus having storage means for storing confidential image data, non-confidential image data, and additional information for the image data, the program comprising:
   a program code for causing a computer to execute a data processing method comprising a display control step of providing control to display the additional information for the image data stored in said storage means, and a determining step of determining whether or not to display the additional information for said confidential image data, and
   wherein:
   said display control step provides control to display the additional information for both said confidential image data and said non-confidential image data when said determining step determines that the additional information for the confidential image data is to be displayed; and
   said display control step provides control to display the additional information for said non-confidential image data when said determining step determines that the additional information for the confidential image data is not to be displayed.

24. A computer readable medium according to claim 23, wherein the data processing method further comprises a selecting step of allowing a user to select image data to be output from the displayed additional information for the image data controlled to display by said display control step, and an output step of outputting the image date selected by said selecting step.

25. A computer readable medium according to claim 23, wherein said storage means stores said image data in a plurality of separate boxes, and the data processing method further comprises a box selecting step of allowing the user to select a desired one of said plurality of boxes, and wherein said display control step comprises providing control to display the additional information for the image data contained in the box selected by said box selecting step.

26. A computer readable medium according to claim 25, wherein when the desired box is selected by said box selecting step, said determining step determines whether or not to display the additional information for said confidential image data, and wherein said display control step controls display of the additional information for the confidential image data and the non-confidential image data responsive to the determination of said determining step.

27. A computer readable medium according to claim 25, wherein when the desired box is selected by said box selecting step, said display control step provides control to display the additional information for the non-confidential image data in the selected box.

28. A computer readable medium according to claim 27, wherein if said determining step determines that the additional information for said confidential image data is to be displayed while the additional information for the non-confidential image data in the selected box is displayed, said display control step provides control to display the additional information for bath confidential and non-confidential image data contained in the selected box.

29. A computer readable medium according to claim 23, wherein said determining step comprises determining whether or not to display the additional information for said confidential image data, by checking a password.

30. A computer readable medium according to claim 23, wherein said storage means stores said confidential image data and said non-confidential image data in separate storage areas.

31. A computer readable medium according to claim 24, wherein said output step comprises printing the image data selected by said selecting step.

32. A computer readable medium according to claim 23, wherein the program further comprises a program code for causing the computer to execute a registering step of registering said image data in said storage step.

33. A computer readable medium according to claim 32, wherein said storage means has a security storage area and a non-security storage area in which said confidential image data and said non-confidential image data are separately stored, respectively, and said registering step comprises determining whether said image data is to be stored in said security storage area or in said non-security storage area, depending on whether or not said image data is confidential, and registering said image data in one of said security storage area and said non-security storage area in which the image data is determined to be registered.

34. A data processing apparatus having storage means for storing confidential image data, non-confidential image data, and additional information for the image data, the data processing apparatus executes a computer program comprising:
  a program code for causing said data processing apparatus to execute a display control step of providing control to display the additional information for the image data stored in said storage means, and a determining step of determining whether or not to display the additional information for said confidential image data, and
  wherein:
  said display control step provides control to display the additional information for both said confidential image data and said non-confidential image data when said determining step determines that the additional information for the confidential image data is to be displayed; and
  said display control step provides control to display the additional information for said non-confidential image data when said determining step determines that the additional information for the confidential image data is not to be displayed.

* * * * *